UNITED STATES PATENT OFFICE.

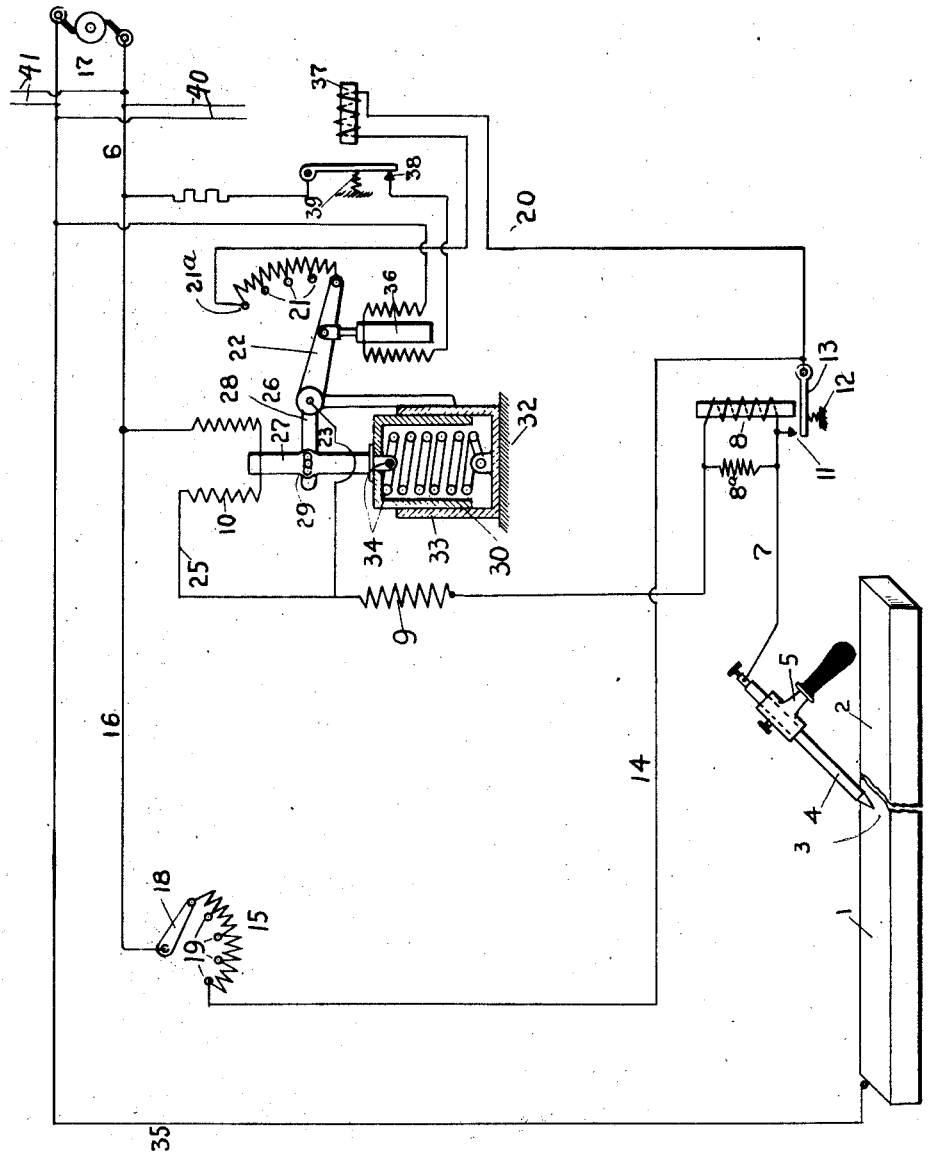

DAVID H. WILSON, OF PATERSON, NEW JERSEY, ASSIGNOR TO WILSON WELDER & METALS COMPANY, INC., A CORPORATION OF NEW YORK.

ELECTRIC WELDING SYSTEM.

1,386,215.     Specification of Letters Patent.     Patented Aug. 2, 1921.

Application filed November 24, 1913, Serial No. 802,699. Renewed February 24, 1916. Serial No. 80,121.

*To all whom it may concern:*

Be it known that I, DAVID H. WILSON, citizen of the United States, and resident of Paterson, in the county of Passaic and State of New Jersey, have invented certain new and useful Improvements in Electric Welding Systems, of which the following is a specification.

My invention comprises a method of electrical welding and it consists in such a regulation of current as will produce a perfect weld. Heretofore it has been the custom to accomplish welding by means of a current sufficiently powerful to carry a fused metal into a crack or joint between two other portions of metal. In accomplishing this result a tool is manipulated by hand in such a way that an arc is formed between the tool and the metal to be welded carrying fused metal from the tool to the metal to be welded. Such hand operated tools vary in their distance from the metal being welded with the result that the arc has to travel across a space which varies in its resistance, and consequently this varies the amperage of the current. This variation results in irregularity and porosity in the weld.

The object of my invention is to maintain a somewhat even amperage at all times regardless of the resistance and space across which the arc has to travel in making the weld.

In other words my invention tends to offset and counteract the irregularity of the manual manipulation of the welding tool.

In the drawings the figure shows in diagram an apparatus by means of which my method may be accomplished, though it is apparent that many other forms of apparatus will accomplish the same result.

In the drawing two portions of metal 1 and 2 are shown having a crack 3 adapted to be welded by means of the welding tool 4. The welding tool is held by an insulating handle 5 and is normally connected to a conductor 6 leading to a generator or other source of current 17 over the following circuit: conductor 7, magnetic coil 8, shunt 8ª in multiple therewith, resistance 9 and solenoid coil 10 to conductor 6. When the tool 4 is touched to the metal at 3 a current passes over this circuit which should have a minimum welding volume of perhaps about 25 amperes at 50 volts. The initial circuit instantly and automatically closes the open pair of contacts 11 held normally open by the spring 12 adapted to close branch circuits arranged to deliver an additional amount of current to the welding tool. The first of these branch circuits may be traced from the conductor 7 through the closed pair of contacts 11 retracted by spring 12, the armature 13, conductor 14, rheostat 15, conductor 16, thence through the line conductor 6 to the source of current indicated at 17. The rheostat 15 is designed and constructed to be operated by hand and may be set in a number of positions for the purpose of arbitrarily fixing the major amount of current intended to be delivered to the tool 4 for the particular welding operation in hand. The arm 18 of the rheostat may be swept over the contacts 19 to introduce such variable resistance as will permit the passage of say 25 or 50 or 75 or 100 or 125 amperes, as may be desired.

A second branch circuit is also established by the circuit closer 8 which may be traced as follows: conductor 7, contacts 11, armature 13, conductor 20, circuit breaker 37, the variable resistance 21 of the automatic rheostat, arm 22 of the rheostat, conductor 23, conductor 25, solenoid 10, conductor 6 and generator 17. This branch circuit just traced may introduce a variable resistance into the circuit of the welding arc between the tool 4 and the weld 3. This resistance varies to such an extent as would tend to vary the amperage by an amount from zero to 15 amperes. The variable resistance 21 should therefore be so adjusted as to compensate for the variation at the tool. The arm 22 of the automatic rheostat is turned upon its pivot 26 by means of the core 27 of the solenoid which is operatively connected to the arm 28 of the lever by the pin and slot 29. The core 27 is normally retracted to the position shown in the drawing by means of the coil spring 30, one end of which is secured to the projection 34 of the core 27 and the other end secured to a fixed base 32. In order to render the movements of the core 27 sluggish, a dash pot is employed one portion of which 33 is secured to the base and the other portion of which is secured to the core 27 as shown.

When current is caused to pass through the tool 4 and weld 3 the solenoid coil 10 pulls upon the core 27 raising the arm 28 of the lever causing the arm 22 of the lever to pass over the various contact points 21 of the variable resistance until the pull of the solenoid coil balances the increasing pull of the spring 30 after which the arm 22 comes substantially to rest. If the resistance between the tool 4 and the welding 3 increases, it causes a reduction of current in the solenoid 10 which permits the spring 30 to retract the core 27 thereby reducing the resistance at 21 and thus increasing the flow of the current through the conductor 20 to the tool 4. If the resistance at the tool is decreased a stronger pull upon the core 27 is exerted by the solenoid 10 thereby automatically introducing a greater portion of the resistance 21 into the circuit with the tool thereby reducing the flow of current through the tool.

When the tool 4 is first applied to the weld it is desired to prevent a rush of current over the resistance 21. If the arm 22 under the tension of spring 30 rested on the lowest resistance point 21ª, such a rush would occur, and fused metal would be splashed around. To prevent this a solenoid 36 is introduced in a normally closed circuit bridged across the line conductors 6 and 35 to hold the arm 22 in the position to introduce a considerable resistance into the circuit of the tool 4 until the solenoid coil 10 exerts its balancing influence upon the automatic resistance varying device 21. The current through the solenoid 10 flows also through the coil 37 and opens the contacts 38 held normally closed by the spring 39 at the same instant that the solenoid exerts its balancing pull on the core 27. The arm 22 sweeps over the resistance 21 reducing the amount of resistance in the circuit until the balance is established.

The line conductors 6 and 35 may supply a current of say 50 volts and from 100 to 500 amperes. The resistance rheostat may vary from 0 to about 2 ohms.

A shunt 8ª may pass the greater portion of the welding current about the circuit closer 8.

It will be noted that when the welding tool 4 is brought into contact with the work, current first flows through the branch 25 thereby closing the contacts 11 and introducing the adjustable resistance 21 which builds up the current required for drawing the arc.

An additional adjustable rheostat 15 is employed adapted to be adjusted as to its resistance and adapted to complete the welding circuit when the current flows through the welding tool. The amount of resistance reduction depends upon the position of the rheostat switch arm 18 and means are employed for removing an adjustable portion of the resistance from the circuit consisting in the conductors 16 and 14 which are brought into the welding circuit by the contacts 11.

Suitable apparatus well known to electricians may be employed in place of the diagrammatic apparatus shown.

Any kind of heating current suitable for welding may be employed, and the main purpose of my invention is to secure an even heat in the arc, regardless of the resistance of the arc or of the character of the current.

Duplicate operators' outfits may be connected to branch conductors 40, and also to conductors 41.

Many variations in the apparatus and circuits may be made without departing from the spirit of my invention.

I claim.

1. In an electric welding system, a source of current supply, a welding circuit connected therewith including a welding tool, and automatic compensating means comprising resistance connected therewith, said compensating means being responsive to current variations therein to compensate for the variation of resistance in the welding arc.

2. In a welding system, a welding tool, a source of supply, a primary starting circuit for welding and an automatic compensating means including resistance operated by the variation of resistance in the welding arc to maintain an even amperage and thereby maintain an even flow of heating current.

3. In a welding system, a welding tool, a source of supply, a starting circuit and an automatic compensating means including resistance in multiple therewith operated by variations of resistance in the welding arc to maintain a current of even amperage and thereby maintain an even heating current through the tool.

4. In a welding system, a welding tool, a source of current supply, a starting circuit, an automatic resistance operated by the variation of resistance in the welding arc to maintain an even flow of heating current and a manually operated rheostat adapted to supply arbitrarily fixed flow of additional heating current to the welding tool.

5. In a welding system, a welding tool, a source of current supply, a starting circuit, an automatic resistance operated by the variation of resistance in the welding arc to maintain an even flow of heating current and a manually operated rheostat adapted to supply arbitrarily, an additional fixed flow of current to the welding tool, located in a branch circuit around said automatic resistance.

6. In a welding system, a welding tool, a source of current supply, a starting circuit, an automatic resistance operated by the variation of resistance in the welding arc to maintain an even flow of heating current and a manually operated rheostat adapted to supply arbitrarily an additional fixed flow of current to the welding tool, located in a branch circuit around said automatic resistance and also in a branch circuit around said starting circuit.

7. A method of electrically welding fusible conducting material together, which consists in supplying a fixed flow of current through one branch circuit and in supplying a compensating current in another branch circuit to compensate for the variations in the welding arc, which compensating current is controlled by and responsive to the variations of resistance in the welding arc.

8. The method of electrically welding fusible conducting materials together which consists in creating a welding arc between them and regulating the arc to provide a current of even amperage.

9. The method of electrically welding fusible conducting materials together which consists in creating a welding arc between them and regulating the arc to provide a current of even amperage and potential.

10. In a welding system, in combination, welding electrodes, an electro-responsive power controller therefor, an electro-responsive governing device for said controller and power connections for said electrodes including the windings of said controller and governing device in series therewith.

Signed at New York, in the county of New York and State of New York.

DAVID H. WILSON.

Witnesses:
MYRON F. HILL,
A. L. TRAVIS.